Aug. 17, 1965    J. W. HURST    3,200,575
AUTOMATIC FRUIT PICKING MACHINE
Filed May 11, 1964    4 Sheets-Sheet 1

INVENTOR.
JAMES W. HURST
BY
H. W. Brelsford
ATTORNEY

Aug. 17, 1965    J. W. HURST    3,200,575
AUTOMATIC FRUIT PICKING MACHINE
Filed May 11, 1964    4 Sheets-Sheet 2

INVENTOR.
JAMES W. HURST
BY H. W. Brelsford
ATTORNEY

Aug. 17, 1965  J. W. HURST  3,200,575
AUTOMATIC FRUIT PICKING MACHINE
Filed May 11, 1964  4 Sheets-Sheet 3
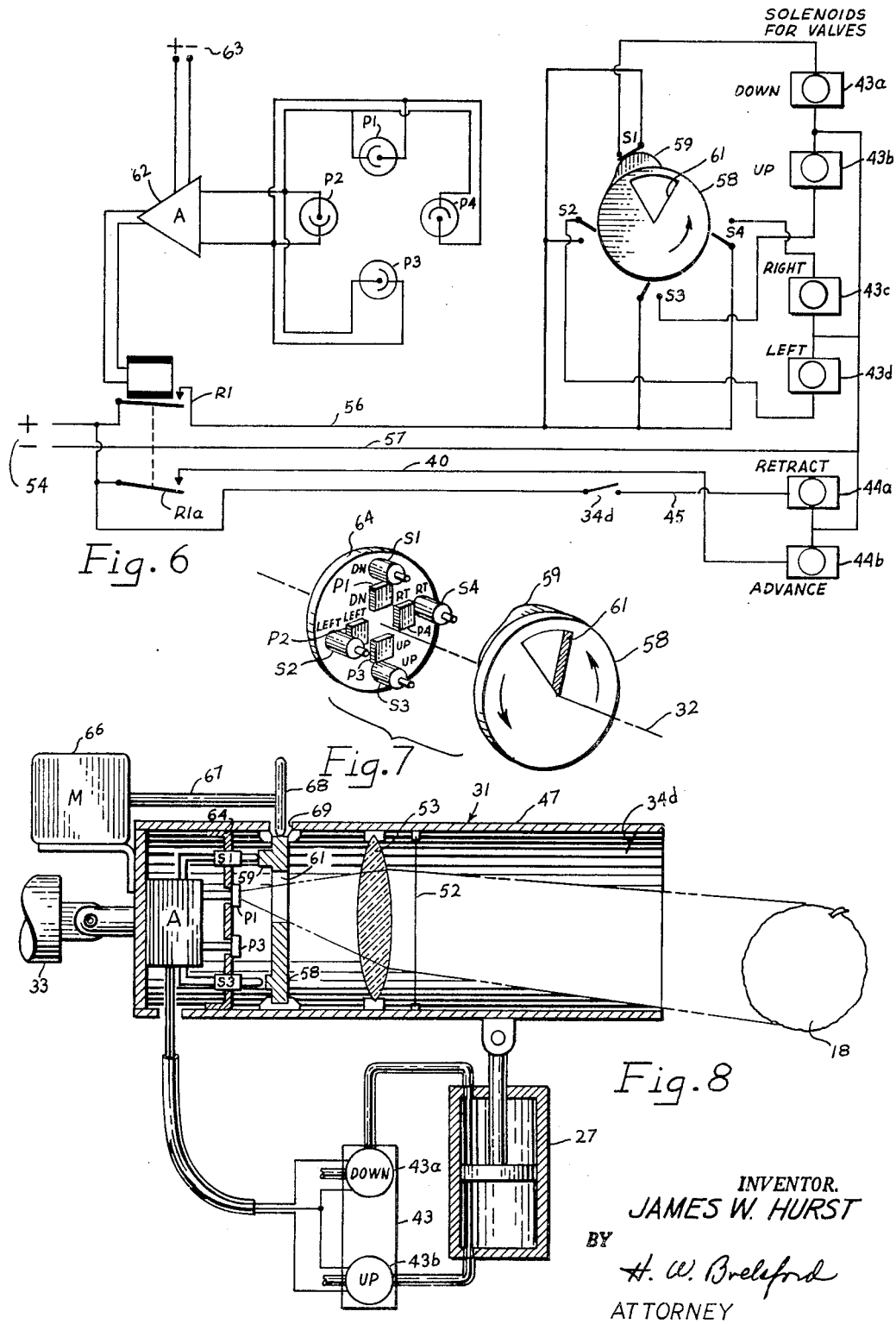
INVENTOR.
JAMES W. HURST
BY
H. W. Breleford
ATTORNEY Aug. 17, 1965  J. W. HURST  3,200,575
AUTOMATIC FRUIT PICKING MACHINE
Filed May 11, 1964  4 Sheets-Sheet 4

INVENTOR.
JAMES W. HURST
BY
H. W. Brelsford
ATTORNEY

United States Patent Office 3,200,575
Patented Aug. 17, 1965

3,200,575
AUTOMATIC FRUIT PICKING MACHINE
James W. Hurst, 5572 Berkeley Road,
Santa Barbara, Calif.
Filed May 11, 1964, Ser. No. 366,464
13 Claims. (Cl. 56—328)

My invention relates to fruit picking machines and has particular reference to an automatic machine for picking fruit having a pronounced color, or having a color that contrasts to the foliage of the plant upon which it grows. While my machine is useful for the picking of many fruits, such as apples, pears, peaches, etc., it will be described with reference to citrus fruit, and particularly oranges.

Many different approaches have been tried for the machine harvesting of fruit. Some types of harvesting depend on mechanically shaking the tree or bush to allow the fruit to fall to the ground or onto a net. Other types are based on culturing or supporting the tree or plant so that the fruit hangs below a mechanical support under which mechanical cutters are moved. Still others depend upon mechanically combing the outer limbs and branches of trees to comb the fruit off of the tree. These and other mechanical harvesters have been tried with varying degrees of success. While power operated, none of them can be classed as automatic in the sense that they seek out a particular fruit and pluck it.

My machine operates automatically in the true sense of the word, in that an operator need merely position the machine adjacent to a citrus tree and thereafter the machine seeks out individual fruit and picks or plucks each orange or other fruit individually from the tree. My machine takes the place of the human hand picker who usually operates from a ladder in a citrus grove, picks fruit within an arm's length, and then moves the ladder to a new position. Furthermore, my machine is adjustable to pick fruit of only a certain ripeness as indicated by the color of the fruit. Thus, the machine can be selective just as is the human picker. This is especially important in certain types of citrus groves as the trees have a long bearing season, and small unripe fruit is often on a tree is heavily loaded with mature fruit.

Briefly, my invention utilizes photo-electric or photo-responsive devices made sensitive to the color of fruit being picked, and the photo device directs a mechanical picker to the fruit. Upon engaging and cutting the fruit from the tree, the picking arm directs the picked fruit to a receiving system, then retreats to a starting position and again the photo-electric device seeks out a new fruit to repeat the cycle. The presently preferred embodiment of the invention combines the three functions in a single tubular member. Thus, the photo-electric device, the picking mechanism, and the fruit transporting mechanism are combined.

It is, therefore, a general object of my invention to provide an automatic fruit picker.

Another object of the invention is to provide a fruit picker that picks fruit of a selected color.

A further object of my invention is to provide an automatic fruit picker that has a photo-electric device that directs a mechanism to an individual fruit for picking.

Still another object is to provide an automatic fruit picker that transports the picked fruit to a receiving bin or vehicle.

Another object is to provide a tubular picking arm combining the functions of picking and transporting, picking and optically detecting the fruit, and transport the optically detected and picked fruit.

Another object is to provide an automatic picking machine that operates continuously to seek out its own fruit, pick it, and return to action to pick additional fruit.

Other objects, advantages, and features of my invention will be apparent in the following description and claims considered together with the accompanying drawings forming an integral part of this application in which:

Figure 2:
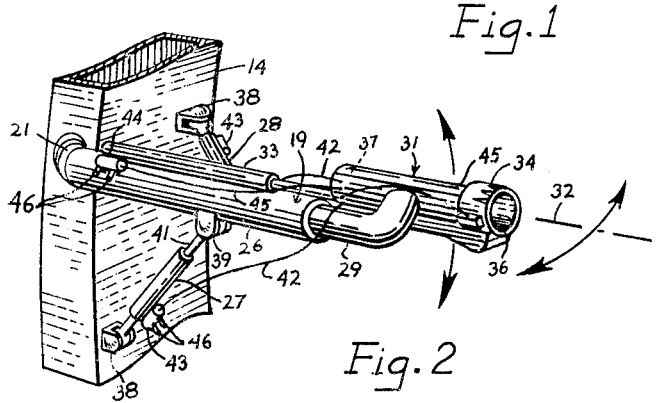
FIG. 2 is a perspective view of a fragment of the machine of FIG. 1 showing an automatic picking arm and its power actuating motors secured to the curved hollow boom of FIG. 1.
Figure 3:
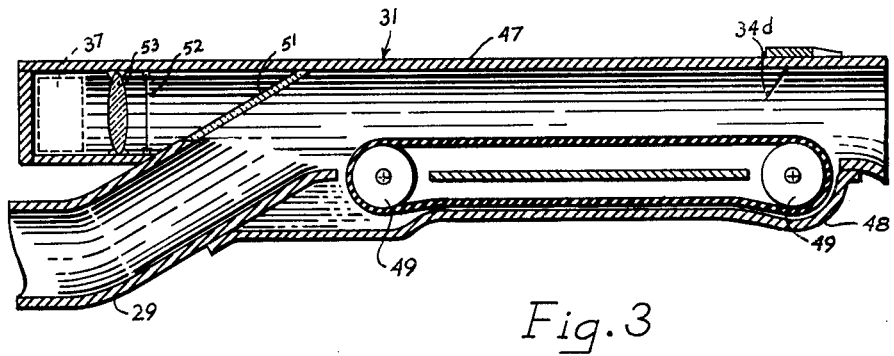

FIG. 3 s a longitudinal sectional view through the picking arm of FIG. 2.

Figure 4:
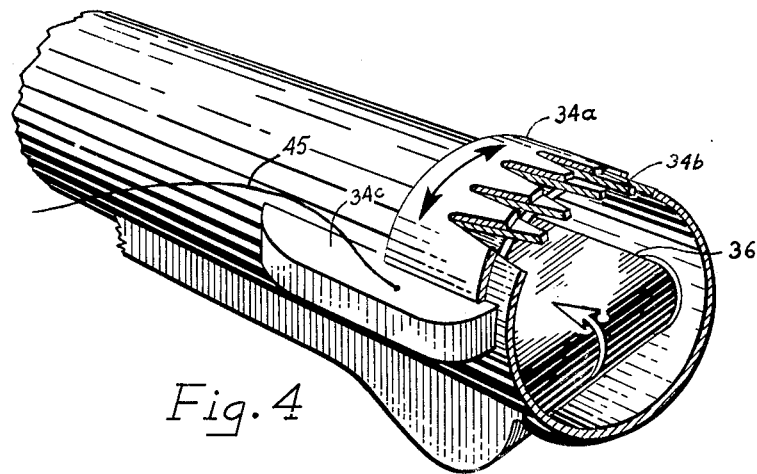

FIG. 4 is an enlarged perspective view of the outer end of the picking arm of FIG. 2 and FIG. 3.

Figure 1:
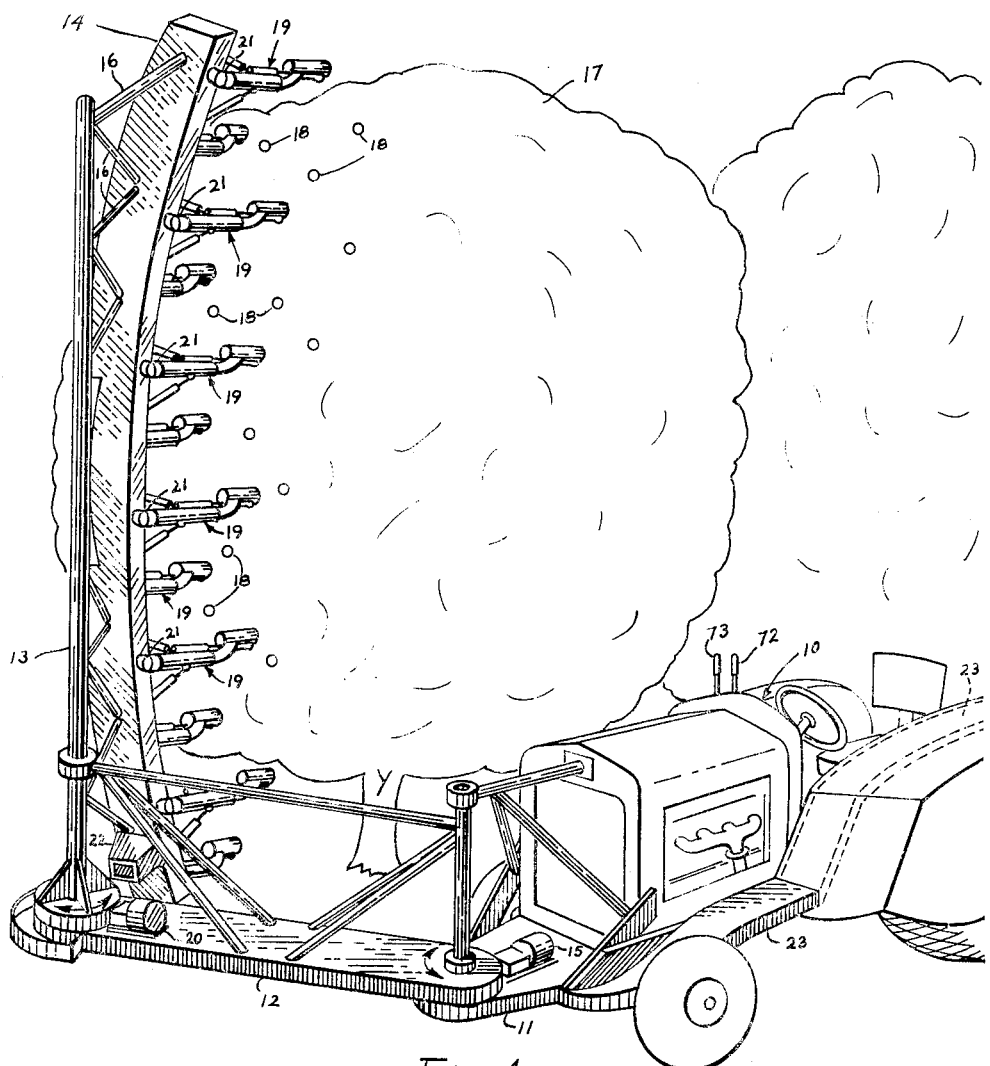
FIG. 1 is a perspective view of a tractor supporting a harvesting machine incorporating the invention, which machine is positioned adjacent to a citrus tree for harvesting oranges from the tree.
Figure 5:
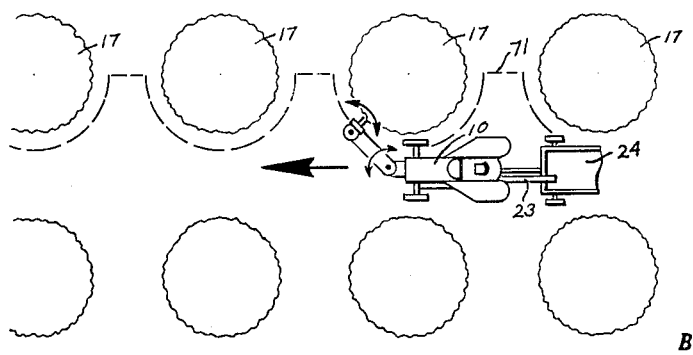

FIG. 5 is a plan view of the tractor of FIG. 1 showing its path of movement between two rows of citrus trees, and showing the path of movement of the picking boom.

FIG. 6 is a schematic electric circuit for the picking arm of FIG. 2.

FIG. 7 is an exploded perspective view of the rotating window and the photocell and switch mechanism of a presently preferred type of photo-responsive mechanism.

FIG. 8 is a simplified mechanical schematic diagram of the actuating mechanism of the picking arm of FIG. 2.

Figure 9:
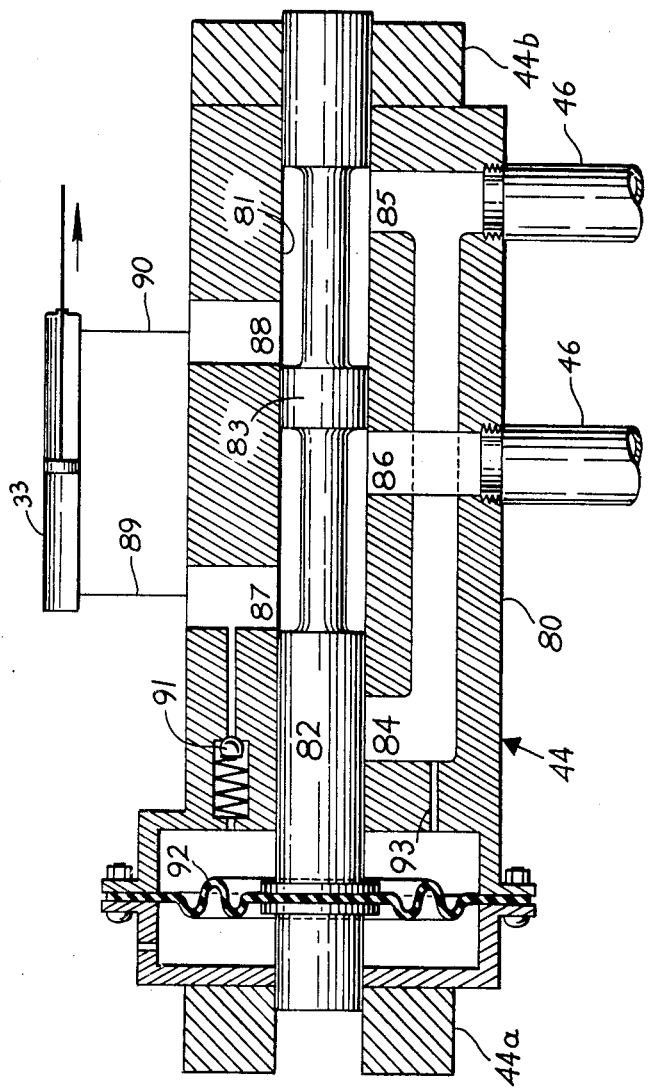

FIG. 9 is a sectional view of an automatic reversing valve that is also solenoid operated for operating the picking arm of FIG. 2.

Referring to FIG. 1, a tractor 10 has a hollow platform 11 projecting from the front thereof upon which is swiveled a hollow horizontal cantilever beam 12 supporting a rotatable mast 13 to which is secured by suitable braces 16, a hollow, generally vertical, curved boom 14, having a height and curvature conforming to an orange tree 17 which has oranges 18 scattered throughout its outer foliage. Secured to the hollow boom 14 are a plurality of picking arms 19 having a hollow universal joint 21 connecting the arm to the boom and through which the picked fruit travels to the interior of the hollow boom 14. Fruit thus picked is delivered by a spout 22 to the horizontal cantilever beam 12 which contains internal mechanism (conveyor belts) to deliver the picked fruit to the interior of the hollow platform 11 on the forward part of the tractor 10, whence it passes by a conveyor chute 23 to the rear of the tractor 10 to be delivered into a suitable trailer, wagon, or cart 24 shown best in FIG. 5.

Shown best in FIG. 2 is a fragment of the hollow curved boom 14 to which is secured one of the picking arms 19 and there is illustrated also the hollow tubular universal joint 21 connecting that arm to the boom 14. The arm 19 has an outer tube 26 which is held at any desired angular relationship to the boom 14 by a cylindrical motor 27 controlling the motion of the arm 19 in a vertical plane and a cylindrical motor 28 controlling the motion of the arm 19 in a horizontal plane. Reciprocating within the outer tube 26 is a delivery tube 29 to which is connected a picking head 31. The picking head 31 reciprocates along an axis 32 and is actuated by a cylindrical motor 33 mounted on the outer tube 26. Thus, the motors 27 and 28 cause the entire picking arm 19 to move through a cone of movement and simultaneously, the motor 33 reciprocates the picking head 31 into and out of the orange tree.

The picking head 31 of FIG. 2 carries out a triple function: it picks the fruit by cutting the stem of the fruit by means of a cutter mechanism 34 disposed on the outer end of the picking head 31, it receives and transports the picked fruit by means of an endless belt mechanism 36 disposed within the picking head 31, and it directs the movement of the entire arm 19 by means of a photo-responsive mechanism disposed at the rear end of the picking head 31 and indicated by the reference numeral 37.

While I presently prefer piston-cylinder motors to actuate each picking arm 19 it will be obvious that various types of motors can be used. I illustrate for each motor 27 and 28, a fixed socket 38 securing one end of each motor to the boom 14, and a moveable socket 39 secured to the outer tube 26 which sockets receive a piston rod 41 for each motor 27 and 28. Also illustrated for the motors 27, 28 and 33 are valve mechanisms. The valve mechanisms are all controlled by the picking head 31. Valves 43 on the motors 27 and 28 are controlled by the photo-electric mechanism 37 of the picking head, and wires 42 (shown exposed for purposes of illustration) lead from this mechanism to each valve 43. A valve 44 for the reciprocating motor 33 is controlled by the picking mechanism 34 and a wire 45 leads from that mechanism to the valve 44. The valve 44 is also controlled by the photo mechanism 37 and wire 40 leads to valve 44. The valve 44 is also an automatic reversing valve causing the motor 33 to reverse when it reaches the end of its stroke, in addition to reversing upon an electrical impulse from the picking mechanism 34. Each valve has a pair of conduits 46 connected thereto, one supplying fluid under pressure and the other leading to exhaust.

Shown in FIG. 9 is the reversing valve 44 which has a body 80 to which are connected the conduits 46. The body has a central bore 81 in which is disposed round valve slide 82 having a central land 83 with relieved portions on each side. An exhaust passage is forked to provide two spaced exhaust ports 84 and 85 at the central bore and a pressure passage provides a pressure port 86 between the exhaust port. The upper port of the body is apertured between the three ports 84, 85 and 86 to provide cylinder ports 87 and 88. Leading from cylinder port 87 is a conduit 89 connected to one end of the motor and leading from cylinder port 88 is a conduit 90 leading to the other end of motor 33.

When the piston of motor 33 reaches the end of its stroke, the fluid pressure builds up to full static pressure and this opens a relief valve 91 connected to cylinder port 87 allowing fluid to flow against a diaphragm 92 connected to the valve slide 82. This moves the valve slide 82 to the left in FIG. 9 placing land 83 between ports 86 and 87, reversing the flow to motor 33, and the motor retracts the picking head 31. The relief valve closes because it is now connected to exhaust pressure in the port 87. A bleed passage 93 permits the reversing fluid to escape to exhaust when the valve is actuated by an advance solenoid 44b. A retract solenoid 44a can also move the valve slide 82 to the left to cause the motor 33 to retract the picking head 31.

Referring now to FIGS. 3 and 4, there is illustrated portions of the picking head 31. Referring first to the picking mechanism, the picking head 31 may have a main tubular member 47 having an outer end at the right in FIG. 3 and an inner end to the left in FIG. 3. The upper portion of the outer end of the tube 47 is slotted to form a series of teeth 34b, and mounted on top of this serrated portion of the tube is a reciprocating cutter bar 34a actuated by a motor which is not shown, but which is housed within the housing 34c. The cutter bar 34a reciprocates continuously through an arc. A motor with a crank, connected to the cutter bar 34a by an arm is a suitable drive mechanism. Since the weight of the fruit causes it to hang downwardly on its stem, the cutter mechanism encountering the stem severs it and causes the fruit to drop down on the endless belt 36 which then transports the fruit to the left in FIGS. 3 and 4 to the delivery tube 29. The endless belt 36 is disposed in a housing 48 secured to the lower side of the tube 47 and is mounted between a pair of rollers 49 which are constantly driven by a motor which is not shown. Disposed diagonally across the tube 47 at the region of the delivery tube 29 is a transparent deflector 51 which directs the fruit into a delivery tube 29 from the endless belt 36 and at the same time, permits light to travel down the tube to the photosensitive mechanism 37 shown generally in broken outline. Disposed behind the deflector 51 is a color filter 52 which can be of any selected material to transmit only certain desired colors to the photo-responsive mechanism 37. A lens 53 is disposed ahead of the photo-responsive mechanism 37 to better resolve the light passing to the mechanism and create an optical axis parallel to the tubular axis as well as parallel to the reciprocation axis 32.

Referring now to FIGS. 6, 7, and 8, there is illustrated a presently preferred type of photo-responsive mechanism, but it will be apparent to those skilled in the photo-electric arts, that various other types of mechanisms can be used. The mechanism illustrated is designed to control the motors 27 and 28, and to partially control motor 33, which controls each picking arm 19 to give an up-and-down motion by the control of fluid to the motor 27 and to control right and left motion by the control of fluid to the motor 28, and axial in-and-out motion by the control of fluid to motor 33. There is schematically illustrated in FIG. 8, only the up-and-down motor 27.

Referring now to FIG. 6, there is illustrated on the righthand side thereof six solenoids for valves, including up and down solenoids 43a and 43b, right and left solenoids 43c and 43d, and retract and advance solenoids 44a and 44b. These solenoids are, of course, respectively disposed in the valves 43 of motors 27 and 28, and the valves 44 of motor 33. The solenoids receive electric energy from any suitable source indicated by the plus and minus 54, current from which is primarily controlled by a normally open relay R1, controlling current flow through a conductor 56. Conductor 57 connected to source 54 is connected to one side of each solenoid 43a, 43b, 43c, 43d, 44a, and 44b. Relay R1 has a second armature R1a, which is normally open, controlling current to the other side of solenoid 44b.

Referring still to FIG. 6, it will be noted that conductor 56 is connected to four switches, S1, S2, S3, and S4, arranged in a circular pattern about a revolving window rotor 58 which has a cam 59 projecting therefrom which selectively closes the normally opened switches S1, S2, S3, and S4. The switches are connected, one each, to the respective solenoids 43a, 43b, 43c, and 43d. If, therefore, the relay R1 is actuated, the rotating cam 58 will close in sequence switches S1, S2, S3, and S4, which in turn will actuate in the same order, solenoids 43a, 43b, 43c, and 43d to cause the picking arm 19 of FIG. 1 to move respectively down, then up, then right, and then left. However, relay R1 is normally open and closing switches S1, S2, S3, and S4 has no effect until relay R1 is actuated.

It will be noted that the rotating window cam 58 has a window 61 which transmits light to photo-responsive devices P1, P2, P3, and P4. These photo-responsive devices are connected in parallel to an amplifier 62 which is energized by any suitable source indicated by the source 63. The amplifier, in turn, is connected to the relay R1, accordingly, actuation of a photo-responsive device P1, P2, P3, and P4 will cause a current to flow from the amplifier 62 to actuate the relay R1 causing it to close the relay switch in conductor 56 to supply electric power to the solenoids 43a, 43b, 43c, and 43d when the switches S1, S2, S3, and S4 are closed, and 44a when switch 34d is closed. Actuation of relay R1 also causes armature R1a to close actuating advance solenoid 44b. It will be noted that the photo-responsive devices have the same spacial arrangement as the switches S1, S2, S3, and S4, and, accordingly, are optically or mechanically related in this sense.

The mechanical and optical relationship of the switches and photo-responsive devices is best illustrated in FIG. 7. There it will be noted that the rotating window and cam 58 is disposed on the optic axis 32 which also passes through the center of a mounting plate 64 upon which are disposed the switches S1, S2, S3, and S4, and the photo-responsive devices P1, P2, P3, and P4. It will be noted further that the cam 59 on the rotating window, and the window 61 itself, have the same disposition with respect to the switches and photo-responsive devices shown in FIG. 6. As the rotating window 58 is rotated, light will fall first on one photo-responsive device and successively on another as shown by the arrows of rotation in FIG. 7 and also in FIG. 6. The switch related to the photo-responsive device will be closed by the cam 59 at the same time the photo-responsive device receives light through the window 61. Therefore, if light is falling upon any photo-responsive device P1, P2, P3, or P4, the amplifier 62 will be energized to close relay R1 causing current to flow to the solenoid connected to the switch that is closed at that instant. The up and down or right and left movement of the picking arm will, therefore, operate for that particular interval. This will cause movement of the picking arm in the direction toward the fruit to center the picking arm 31 on a particular fruit which is sending its light through the window 61. At the same time, the entire picking head 31 will move toward the fruit because advance solenoid 44b of valve 44 is actuated.

Referring now to FIG. 8, there is combined the schematic and mechanical devices of FIGS. 6 and 7 into one mechanism. There it will be noted that the motor 27 for actuating the entire picking arm in an up and down direction is shown (for illustrative purposes only) to be attached directly to the tube 47 of the picking head 31, rather than to the outer tube 26 as shown in FIG. 2. The valve 43 is shown also for this motor having an up solenoid 43b therein, and a down solenoid 43a. Also illustrated is the reciprocating motor 33 secured to the left end of the tube 47 for moving the entire picking head 31 to the right or to the left in FIG. 8. Disposed within the the picking head tube 47 is the color filter 52, the lens 53, the rotating window 58, two of the switches S1 and S3, two of the photo-responsive devices P1 and P3, the amplifier 62, and conductors leading from the amplifier 62 to the solenoids in the valve 43. There is schematically illliustrated in FIG. 8 also, a mechanism for rotating the window 58, in the form of a motor 66, which may be an electric motor having a rotatable shaft 67 on which is mounted a rubber-rimmed wheel 68, which engages the rotable window 58 through a slot 69 in the upper part of the tube 47. By this means the window 58 is rotated.

Referring now to FIG. 8, it will be noted that rays of light from a fruit 18 pass through the color filter 52 and through the lens 53 which resolves these light rays into a meaningful pattern, which rays then pass through the window 61 to impinge upon the photo-responsive device P1. The photo-responsive device causes the amplifier 62 to actuate, closing the relay R1 and causing a current to flow to the switch S1 which at this instant is closed, delivering current to the solenoid 43a. This causes fluid to flow through the valve 43 forcing the motor 27 to actuate in a down direction, thereby causing the picking head 31 to more accurately align itself with the fruit 18.

The rotating window 58 continues to rotate and whenever a sufficiently large amount of color from the orange 18 strikes one of the photocells P1, P2, P3, or P4, the relay R1 is closed, which in turn, actuates the various solenoids to cause the picking head 31 to more accurately align itself with the fruit. At the same time, the motor 33 is moving the entire picking head 31 to the right and, in time, engulfs the fruit 18 and picks it by the mechanism shown in FIG. 4, whereupon the switch 34d is operated actuating solenoid 44a to cause the motor to retract. As explained with reference to FIGS. 3 and 4, the picked fruit is being transported toward the delivery tube 29 to take it out of the picking head and by the time the entire picking head is retracted, it is again clear of the fruit and in a position to seek out and capture and additional fruit.

The operation of the mechanism of FIGS. 6, 7, and 8, continues on from the foregoing description. As the window 58 rotates in a counter-clockwise direction, if there is a fruit so located that it throws a light on the left photo-responsive device P2, then this in turn causes the respective solenoid 43d to be actuated to move the entire picking head to the left to more accurately align with the fruit. In the same fashion, light from the fruit will strike the other photosensitive devices. When the fruit is approximately aligned with the center line of the tube 47, which is the axis 32 of FIG. 7, then all of the photo-responsive devices P1, P2, P3, and P4 will be actuated a like amount and will merely shift back and forth a small amount in an attempt to perfectly center the fruit while the entire head is moving toward the right in FIG. 8 to capture and pick the fruit 18.

It will be appreciated by those skilled in the optical arts, that the lens 53 is the most convenient means of resolving light from the orange 18. Various other means can be used to resolve the light and in this connection, the word "resolve" is used in its broadest connotation of controlling light rays into a form where they convey intelligence, or at least, can be scanned for the intelligence they convey. For example, if the tube 47 of the picking head 31 is long enough ahead of the window 58, then the tube itself has a collimating effect. The tube length ahead of the window 58 should be at least two diameters. Light thus collimated can be scanned by a direction-sensitive mechanism to direct the head toward the source of the light. Another way of considering a long tube is as a pinhole camera that resolves light in the fashion of a lens. Also, it will be appreciated that a pinhole effect can be obtained by a diaphragm type of structure made of flexible leaves of rubber or similar resilient material disposed at the outer end of the picking head 31. Similar light resolving effects can be obtained without the use of the lens by making a pinhole effect on the light color filter 52, especially if the tube 47 is short.

It will be noted also that the rotating window 58 may be eliminated by connecting each photo-responsive device P1, P2, P3, and P4 to its own amplifier, relay and solenoid, thereby having four amplifiers and relays, and eliminating switches S1, S2, S3, and S4.

It is well known in the art of photo-responsive devices, that some are more sensitive to certain wave lengths or frequencies than others. Accordingly, for picking an orange fruit, maximum efficiency can be obtained by using a photo-responsive device most sensitive in the yellow and orange parts of the color spectrum. The use of the color filter 52 makes the machine adaptable to a great variety of fruit, regardless of color, when ordinary photo-responsive devices are employed. It is merely necessary to change the filter to transmit the desired color of fruit in order to get selection for that fruit. As mentioned previously, such a color filter can be so carefully selected that it can distinguish between ripe and unripe fruit where there is a color difference between ripe and unripe fruit.

The general operation of the invention is best illustrated in FIG. 5 which is a plan view of an orchard traversed by a tractor 10 having a picking device embodying the invention mounted on the front end thereof. A number of orange trees 17 are lined in the usual rows in orchards and the tractor 10 moves in a straight line direction between two rows. The operator of the tractor causes the picking mechanism to travel the outside of half of a tree, whereupon the mechanism is changed in its orientation or facing to again pass around half of the next tree. The path of movement of the picking head, therefore, becomes a series of connected semi-circles shown by the broken line 71 in FIG. 5.

The operation is continued with reference to FIGS. 1 and 2. There it will be noted that the tractor 10 is provided with a pair of controls 72 and 73, one of which controls a power means 15 for the angle of the hollow horizontal boom 12 with respect to the tractor 10, and the other controls a power means 20 for the angular relationship of the vertical mast 13 to this cantilever 12. In this fashion, the operator of the tractor can cause the entire picking mechanism to travel in a semi-circular fashion around the outside of the trees, or if he desired, the operator could drive the tractor clear around one tree to completely pick that tree and then drive in a circular fashion around the next tree. At all times, however, the operator of the tractor 10 keeps the picking arms 19 pointed toward the center of the tree to thereby most effectively pick all of the fruit.

Referring now particularly to FIG. 2, light from an orange travels into the picking head 31 to actuate the photo-responsive mechanism 37 in the rear of the head, which mechanism directs the entire picking arm toward the fruit. As previously explained with reference to FIGS. 6, 7, and 8, the photo-responsive devices energize the up and down motor 27 and the left and right motor 28. In the presently preferred embodiment of the invention, however, these motors are not actuated until a fruit causes light to travel into the picking head 31 to energize the photo-responsive mechanism 37. The tree 17 is nevertheless effectively scanned by moving the picking mechanism relative to the tree and by virtue of the large number of picking arms 19 mounted on the curved hollow boom 14 so that any fruit on the tree within the cone of light reception of each picking head 31 will cause that particular arm 19 to actuate. Each picking arm actuates by virtue of the three motors 27, 28, and 33. The motor 27 causes movement of the arm, and, hence, the picking head 31 in an up and down direction, motor 28 causes motion in a left and right direction, and motor 33 in an in and out direction or reciprocation. The rotating window 58 of FIGS. 6, 7, and 8 causes the motors to so direct the picking head 31 that it engulfs a fruit on a tree so that the fruit can be picked.

The picking action itself is brought about by the sliding teeth shown in FIG. 4, wherein the sliding bar 34a reciprocates through an arc and cuts the stems against the stationary teeth 34b. The fruit then is carried by the conveyor belt 36 to the left in FIGS. 3 and 4 to go down the delivery tube 29 and, hence, through the hollow universal joint 21 of FIG. 2 and into the interior of the curved boom 14. The picked fruit is then disgorged through the spout 22 to the interior of the cantilever hollow boom 12; thence, to the interior of the hollow platform 11 on the front of the tractor; and thence, through the conveyor 23 to the rear of the tractor and into the trailer or wagon 24 shown in FIG. 5.

Referring again to FIG. 3, the passage of the fruit to the left causes the closing of switch 34d which, in turn, actuates the soelnoid 44a shown in FIG. 6 and this being part of the valve 44 on motor 33 causes that motor to retract the picking head 31. When light from a new fruit travels through the picking head 31 and impinges on the photo-responsive mechanism 37, the picking arm of 31 repeats the cycle. The conveyor belt 36 is continuously operated.

While the invention has been described with respect to the presently preferred embodiment thereof, it will be apparent to those skilled in the art that numerous changes may be made in the mechanism and in the circuits without departing from the true spirit and scope of my invention. For example, various devices may be used to carry the fruit to the rear instead of the endless belt. For this purpose, rotating wheels, cylinders or brushes could be used, as well as other well known conveyor mechanisms. Any suitable type of cutting mechanism could be used for severing the stem of the fruit to pick it. If desired, the fruit stem could be twisted instead of cut to thereby sever the stem from the fruit. Various types of motors could be used instead of the fluid motors illustrated which are hydraulic or pneumatic. In the electric and photo-responsive circuit of FIG. 6, an almost endless variety of mechanisms can be used to obtain the same result. The silicone photo-voltaic cells shown for photo-responsive devices in that FIG. 6 are merely illustrative of any of the large variety of photo-responsive devices, including photo-resistive devices, photo-capacitance devices, photo-electric devices, photo-conductive devices, gas-discharge devices, photo-inductive devices, and other mechanisms that respond to light, whether visible or invisible. Also, if desired, the picking arms could be made continuously moveable in a limited cone to better receive light from a fruit, rather than depend upon the scanning operation obtained by physical movement of the head from the control of the tractor operator. Also, the picking arms 19 could move in rectilinear fashion, rather than swivel about a universal joint, and could have a flexible tube to deliver picked fruit to the boom. Accordingly, the attached claims are not limited to the precise embodiment illustrated, but include all variations and modifications that fall within the true spirit and scope of my invention.

I claim:

1. An automatic fruit picking machine for picking fruit that reflects light of a definite wave length comprising:
  (a) a support;
  (b) a tubular arm universally mounted on its inner end to the support and reciprocable along an axis from a starting position to an extended position;
  (c) a picking mechanism disposed on the outer end of the tubular arm;
  (d) a photo-responsive device disposed in the arm at a distance of at least two diameters from the outer end so that the light from the outer end falling upon said photo-responsive device is partially collimated and said device having a center;
  (e) power means connected between the support and the arm for reciprocating said tubular arm along the reciprocation axis and for moving the arm at right angles to the axis to define a cone of movement for the arm;
  (f) and means responsive to the light from the fruit striking off center on the photo-responsive device to actuate said power means to move said arm toward the fruit and thereby tend to center the light on said photo-responsive device, and to move the arm to the fruit to pick the fruit.

2. An automatic fruit picking machine for picking fruit that reflects light of a definite wave length or color comprising:
  (a) a support;
  (b) a tubular arm universally mounted to the support and having an inside tubular diameter great enough to receive the fruit being picked and having an outer end, said arm being reciprocable along an axis from a starting position to an extended position;
  (c) a picking mechanism disposed on the outer end of the tubular arm;
  (d) a photo-responsive device disposed in said tubular arm to receive light from the outer end and having a center;
  (e) means for resolving the light falling upon the photo-responsive device to define an optical axis parallel to the reciprocation axis;
  (f) a fruit receiving mechanism disposed in the tubular arm;
  (g) power means connected between the support and the arm for reciprocating the arm along an axis and for moving the arm at right angles to the axis to define a cone of movement for the arm;
  (h) and means connecting the power means and the photo-responsive device and responsive to light from a fruit striking said photo-responsive device off center to actuate said power means to move the picking arm in a direction to center the light on the photo-responsive device, whereby said tubular arm is directed to the fruit and picks and receives the same.

3. Automatic fruit picking machine as set forth in claim 2, wherein the picking mechanism is formed by slots in the outer end of the tubular member and a toothed cutter is reciprocable over said slots to thereby cut fruit from its tree or bush and drop it into the tubular arm.

4. An automatic fruit picking machine as set forth in claim 2, wherein the universal mounting is a hollow tube and the support is hollow so that the picked fruit travels through the picking arm and universal mounting to be received by the hollow support.

5. An automatic fruit picking machine for picking fruit that reflects light of a definite wave length or color comprising;
   (a) a picking arm having an axis along which it is moveable from a starting position to an extended position;
   (b) power means for moving the arm from a starting position to an extended position, and selectively moving it in two directions at right angles to said axis;
   (c) a photo-responsive device mechanically connected to the picking arm;
   (d) means for resolving light falling upon the photo-responsive device to establish an optical axis passing through said photo-responsive device and generally parallel to the picking arm axis;
   (e) and means interconnecting the photo-responsive device and the power means and responsive to light from a fruit striking the photo-responsive device to actuate said power means so that the picking arm is photo-directed to the fruit to pick the fruit.

6. An automatic picking machine as set forth in claim 5, wherein means are provided to return the picking arm to its starting position when it picks a fruit.

7. An automatic picking machine as set forth in claim 5, wherein automatic means are provided to actuate the power means to return the picking arm to its starting position when it reaches its extended position.

8. An automatic machine for picking fruit from a tree comprising;
   (a) a vehicle;
   (b) a generally vertical boom curved to conform to the outline of said tree and supported by said vehicle;
   (c) a plurality of moveable picking arms vertically spaced and mounted on said boom;
   (d) power means between each arm and the boom for moving each picking arm in and out from said boom and in vertical and horizontal directions;
   (e) photo-responsive means carried by each picking arm and connected to the power means for controlling said power means to direct each arm to a fruit; and
   (f) a picking mechanism on each arm to remove the fruit from the tree.

9. An automatic machine for picking fruit from a tree as set forth in claim 8, wherein means connected to the arms are provided to collect the fruit picked by each picking arm.

10. A picking head for a picking arm having power means to move the arm comprising:
    (a) a tubular member having an inner end and an outer end;
    (b) a picking mechanism disposed on the outer end of the tubular member;
    (c) a photo-responsive device disposed in the inner end and receiving light from the outer end of the tube;
    (d) means disposed in the tubular member for resolving the light from the outer end to define an optical axis generally parallel to the tube and to impinge light from a fruit onto said photo-responsive device;
    (e) and means for sensitizing said photo-responsive mechanism to light that is off center from the optical axis, so that control signals may be sent to the power means for the picking arm.

11. A picking head as set forth in claim 10, wherein the means for sensitizing the photo-responsive mechanism includes right-left and up-down photosensitive devices disposed about the optical axis.

12. A picking head as set forth in claim 10, wherein the photo-responsive device has right-left and up-down photo-sensitive elements, switches connected to each photo-sensitive element and a rotating off center window which closes the switches to transmit the response of each element to the power means, while light is directed on each photo-sensitive element.

13. A photo-responsive mechanism for controlling an automatic picking arm having an outer end, having left-right, up-down and retract-advance motors and corresponding motor controls for moving the arm to a fruit to pick the fruit, comprising:
    (a) means secured to said arm for resolving light and defining an optical axis parallel to the retract-advance movement of the arm;
    (b) right-left and up-down photosensitive devices centered about said optical axis on the side of the resolving means away from said outer end of the arm;
    (c) means connecting the devices and the left-right and up-down controls for directing the response of the photosensitive devices to their respective motor controls;
    (d) means for actuating the advance motor control when any photosensitive device responds;
    (e) and means for actuating the retract motor control when a fruit is picked or the arm reaches an extreme of extension.

References Cited by the Examiner

UNITED STATES PATENTS

| | | | |
|---|---|---|---|
| 791,704 | 6/05 | Lardner | 56—338 |
| 2,088,676 | 8/37 | White | 56—14 |
| 2,690,043 | 9/60 | Marihart. | |
| 2,953,229 | 9/60 | Wiegel. | |
| 3,037,651 | 6/62 | Smith | 250—222 X |
| 3,121,304 | 2/64 | Herbst | 56—328 |
| 3,127,725 | 4/64 | Richard | 56—328 |
| 3,138,912 | 6/64 | Mays et al. | 56—328 |

ABRAHAM G. STONE, *Primary Examiner.*

RUSSEL R. KINSEY, ANTONIO F. GUIDA,
*Examiners.*